(12) United States Patent
McMullin

(10) Patent No.: US 7,408,919 B1
(45) Date of Patent: Aug. 5, 2008

(54) INTERNET BASED TELEPHONE LINE

(75) Inventor: William P. McMullin, Bedford (CA)

(73) Assignee: InfoInteractive, Bedford, Nova Scotia (CA)

( * ) Notice: Subject to any disclaimer, the term of this patent is extended or adjusted under 35 U.S.C. 154(b) by 0 days.

(21) Appl. No.: 09/567,758

(22) Filed: May 9, 2000

(51) Int. Cl.
H04L 12/66 (2006.01)

(52) U.S. Cl. .................. 370/352; 370/401; 370/353

(58) Field of Classification Search .......... 370/352, 370/354, 355, 356
See application file for complete search history.

(56) References Cited

U.S. PATENT DOCUMENTS

| | | | | |
|---|---|---|---|---|
| 5,457,797 A * | 10/1995 | Butterworth et al. | ........ | 719/320 |
| 5,805,587 A * | 9/1998 | Norris et al. | ............... | 370/352 |
| 5,999,525 A * | 12/1999 | Krishnaswamy et al. | .... | 370/352 |
| 6,069,890 A * | 5/2000 | White et al. | ............... | 370/352 |
| 6,125,113 A * | 9/2000 | Farris et al. | ............... | 370/389 |
| 6,157,648 A * | 12/2000 | Voit et al. | .................. | 370/401 |
| 6,195,357 B1 * | 2/2001 | Polcyn | .................... | 370/401 |
| 6,243,373 B1 * | 6/2001 | Turock | ...................... | 370/352 |
| 6,292,553 B1 * | 9/2001 | Fellingham et al. | .... | 379/221.02 |
| 6,304,565 B1 * | 10/2001 | Ramamurthy | ............... | 370/352 |
| 6,304,637 B1 * | 10/2001 | Mirashrafi et al. | ........ | 379/88.17 |
| 6,400,812 B1 * | 6/2002 | Svedberg et al. | ........ | 379/114.14 |
| 6,487,196 B1 * | 11/2002 | Verthein et al. | ............... | 370/352 |
| 6,804,224 B1 * | 10/2004 | Schuster et al. | ............... | 370/352 |
| 6,954,454 B1 * | 10/2005 | Schuster et al. | ............... | 370/352 |
| 6,987,756 B1 * | 1/2006 | Ravindranath et al. | ...... | 370/352 |
| 7,145,898 B1 * | 12/2006 | Elliott | ........................ | 370/352 |

OTHER PUBLICATIONS

Lawton, George. "Paving the Information Superhighway's last mile". IEEE. Apr. 1998. pp. 10-12 and 14.*

* cited by examiner

Primary Examiner—Wing F. Chan
Assistant Examiner—Michael J Moore, Jr.
(74) Attorney, Agent, or Firm—Fish & Richardson P.C.

(57) ABSTRACT

A telephone service method that provides subscribers with the functionality of an extra telephone line during data/Internet sessions. Each subscriber has a unique telephone number Dns that can be dialed by anyone with access to the PSTN. When the Dns is dialed the call will be routed via the PSTN to the ILTD server. The ILTD server upon receiving the call attempt from the Dnc will analyze the dialed number (Dns) and determine if the subscriber's computer is able to receive the telephone call. If the subscriber's computer is actively engaged in an Internet Protocol session, with the ILTD client software running, the ILTD server will connect the call over the Internet to the ILTD client software. The ILTD client software will activate the subscriber's sound card and the microphone to play audio and receive input from the microphone to allow the subscriber and the calling party to have a full duplex telephone conversation (i.e. using voice-over-IP technology).

21 Claims, 4 Drawing Sheets

INTERNET BASED TELEPHONE LINE

FIELD OF THE INVENTION

This invention relates to the field of providing telephone service over an Internet Protocol (IP) network, and more particularly, to the provision of full duplex local telephone service and call management features over an IP based network terminating to a personal computer.

BACKGROUND OF THE INVENTION

Currently, the only practical and affordable method to provide local voice telephone service (and associated call management features) is to rent a physical copper circuit from the local telephone company. The copper circuit would connect the-customer premise equipment (CPE) to a central switching office (CO) of a Public Switched Telephone Network (PSTN). The CO is responsible for hosting the subscriber's public dial number and routing the calls to the subscriber's line when the number is dialled. Additionally, the CO is responsible for providing some call management features such as Caller-ID and Call Waiting type services.

Consequently, there is a need for a system and method for providing local telephone services over an IP based network to mitigate the requirement of renting a copper circuit from a telephone company.

SUMMARY OF THE INVENTION

An object of the present invention is to provide a system and method for establishing the equivalent of local telephone service over an IP based network.

In accordance with one aspect of the present invention there is provided a method for providing notification and support for incoming calls having a dialed number identifier associated with a computer in communication with an Internet Protocol based data communications network wherein the data communications network is connected to a public switched telephone network (PSTN) via a call direction server, said method comprising the steps of: notifying the computer when an incoming call is detected on the call direction server; receiving an indication of a selected response action from the computer; and processing the incoming call according to the selected response action.

In accordance with another aspect of the present invention there is provided a method for providing notification and support for incoming calls having a dialed number identifier associated with a computer in communication with an Internet Protocol based data communications network wherein the data communications network is connected to a public switched telephone network (PSTN) via a call direction server having a database of all valid subscriber dialed number identifiers, said method comprising the steps of: obtaining dialed number information about the call from the PSTN; comparing the dialed number information to valid subscriber dialed number identifiers in the database; and providing a message to the computer having a computer address corresponding to the dialed number identifier.

In accordance with a further aspect of the present invention there is provided a method for providing notification and support for incoming calls having a dialed number identifier associated with a computer in communication with an Internet Protocol based data communications network wherein the data communications network is connected to a public switched telephone network (PSTN) via a call direction server, said method comprising the steps of: receiving notification of an incoming call; providing a list of response actions for the incoming call; and sending an indication of a selected response action for the incoming call.

BRIEF DESCRIPTION OF THE DRAWINGS

The present invention will be described in conjunction with the drawings in which.

DETAILED DESCRIPTION OF EMBODIMENTS OF THE INVENTION

The present invention is based on exploiting the growth of affordable high speed Internet access services such as Asynchronous Digital Subscriber Line (ADSL) and Data-over-Cable (DOC). These high-speed services establish a permanent, "always-on", connection to an IP based network. The present invention provides a system and method for providing existing and new voice telephone service delivery in the form of digital packet data over a logical circuit.

Figure 1A:
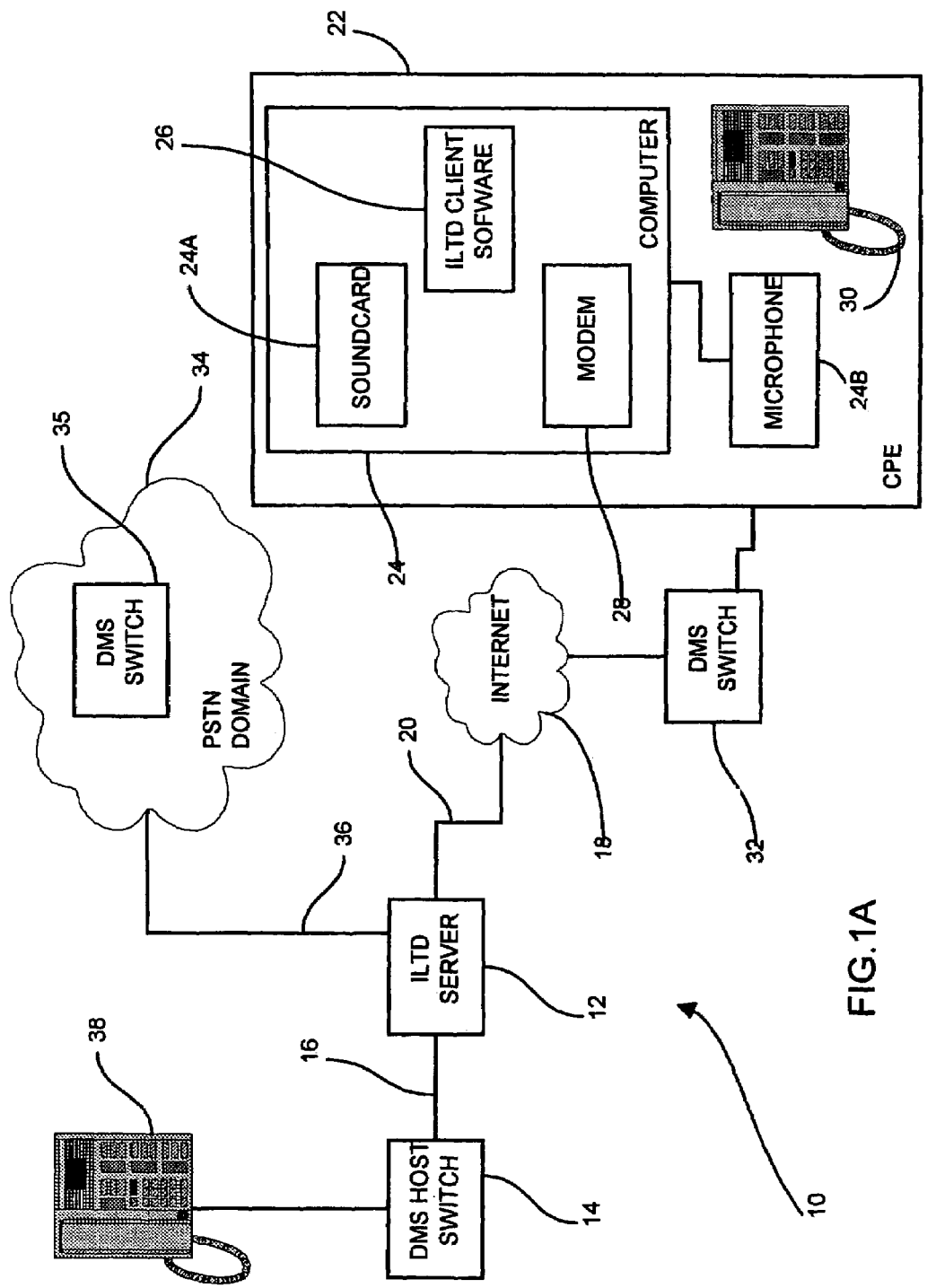
FIG. 1A illustrates a schematic overview of a network embodying the method and apparatus of the present invention.

Referring to FIG. 1A there is provided a system 10 of the network components and interfaces required by the present invention. An Internet Line-Two Director (ILTD) server 12 is connected to a switching point 14 (e.g. a DMS host switch) by an Integrated Services Digital Network (ISDN) Private Rate Interface (PRI) link 16.

The ILTD server 12 is also connected to the Internet 18 through standard TCP/IP lines 20. Customer Premise Equipment (CPE) 22 (including a computer 24 having a soundcard 24A, a microphone 24B, ILTD client software 26, and a modem 28, and a telephone 30) is connected to the Internet 18 through another switching point 32. The ILTD server 12 is also connected to a PSTN (public switched telephone network) domain 34 having a DMS switch 35 through ISDN-PRI links 36. A calling telephone 38 is connected to the switch 14 for placing calls to, for example, the telephone 30.

In the present description, the links 16 and 36 are standard ISDN trunks consisting of 23 B channels and one D (signaling channel). In a configuration where there are multiple PRI trunks, there may be a shared D channel, which is used by multiple links. Subsequent links, which depend on the initial D channel, have 24 B channels. Further, traditional call processing functions are based on the well known Advanced Intelligent Network (AIN) using standard out of band signaling, such as the Signaling System 7 (SS7) protocol.

The above components can be implemented in various ways. A single component can be implemented as stand-alone network equipment, multiple components can be combined in a single item of network equipment or a given component can be partitioned over-two or more items of network equipment.

The following terms are used in the subsequent description and drawings:

Caller's dial number (DN) is Dnc (e.g. from telephone 38)
Caller's name is name_c
Subscriber's DN is Dns (e.g. for telephone 30)
Subscriber's Name is name_s The method of the present invention is a subscription based telephone service that provides subscribers with the functionality of an extra telephone line. Each subscriber 22 has a unique telephone number Dns associated with their telephone 30 that can be dialed by anyone with access to the PSTN 34. When the Dns is dialed (e.g. by a user of telephone 38) the call is routed to the ILTD server 12 through the PSTN 34 using standard AIN/SS7 signaling.

The ILTD server 12 upon receiving the call attempt from the Dnc will analyze the dialed number (Dns) and determine if the subscriber's computer 24 is able to receive the telephone call. If the subscriber's computer 24 is actively engaged in a data communications session over the Internet 18 with the ILTD client software 26 running, the ILTD server 12 will connect the call over the Internet 18 to the ILTD client software 26.

The ILTD client software 26 will activate the subscriber's sound card 24A and the microphone 24B to play audio and receive input from the microphone 24B to allow the subscriber and the calling party to have a full duplex telephone conversation.

Each subscriber typically has a subscription to an Internet access service; either a dialup service or a dedicated access service. It is preferable that the subscribers use a high-speed access service to enable a high level of throughput for the digitally compressed voice stream.

In each local calling area (covered by a typical Local Exchange Carrier {LEC}) at least one computer telephony server (for example an industrial Pentium™ rack mounted computer running the Solaris™ operating system) is required.

As discussed above, the ILTD server 12 is connected to the Internet 18 via one or more high speed dedicated connections 20 to an Internet service provider. To enable high throughput and faster communication with customers, multiple high-speed links could be connected to the ILTD server 12.

The PRI ISDN trunks 16, 36 offer the ability to have an unlimited number of direct-inward-dial (DID) numbers that route to the ILTD server 12. These DID numbers will be assigned to individual subscribers. When calls are routed to the ILTD server 12 via the PRI trunks 16, the DID number is identified to the ILTD server 12 by the switch 14. This notifies the ILTD server 12 which subscriber is being called. In addition to identifying the dialed number (Dns), the PRI trunk 36 carries the calling party number (Dnc) and name (name_c) information as well as other standard call setup data according to the standard AIN call model and SS7 signaling.

Figure 1B:
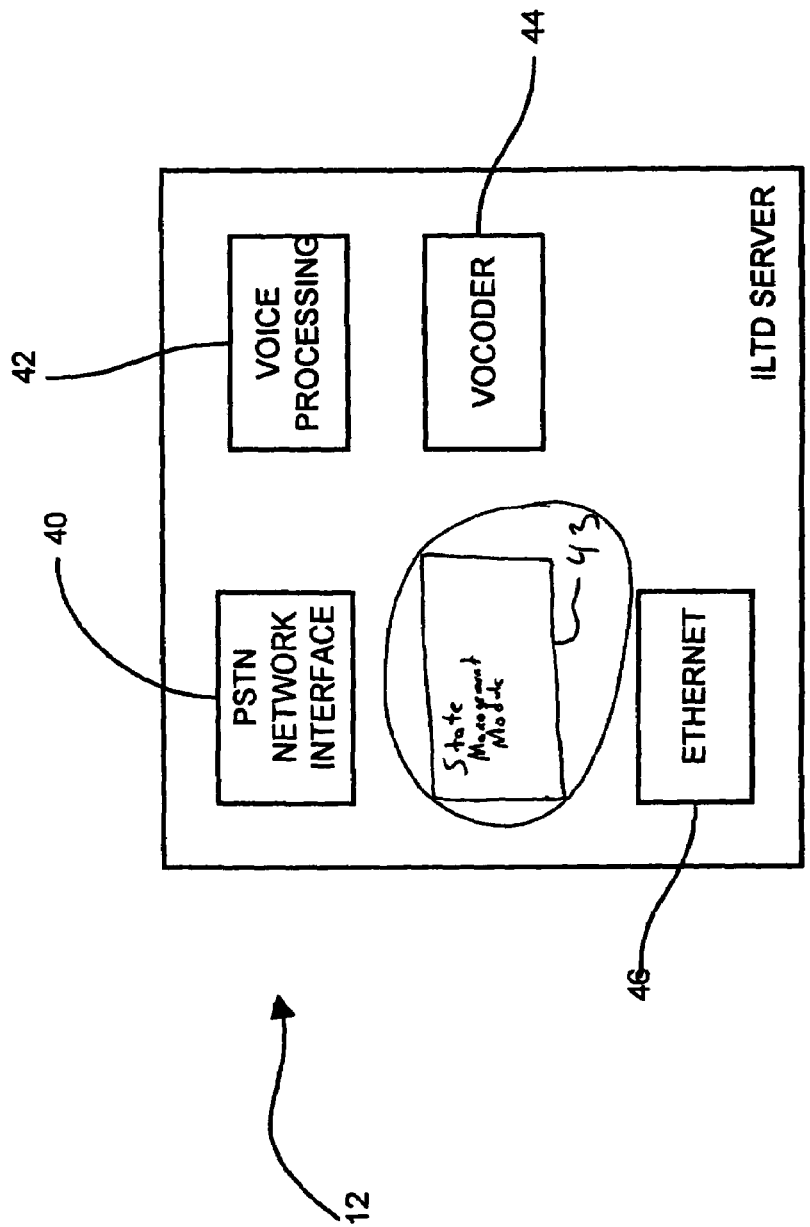
FIG. 1B is a block diagram illustrating the components of the ILTD server of FIG. 1A according to an embodiment of the present invention.

The ILTD server 12 includes a number of components as illustrated in FIG. 1B. Each component has a different responsibility in enabling the IP based telephone line of the present invention. The components of the ILTD server 12 work in conjunction with industry standard digital signal processing hardware, which is installed in the ILTD server 12. In a typical configuration, the ILTD server 12 includes one or more PRI or T1 network interface cards 40 (such as the Dialogic™ D240SCT1), one or more voice processing boards 42 (such as the Natural Microsystems™ AG48), one or more voice-over-IP encoding/decoding (vocoder) boards 44 (such as the Natural Microsystems Fusion™ board) and one or more Ethernet interface boards 46. Each of these components includes an Application Programming Interface (API) well known to those skilled in the art.

Using the components 40, 42, 44 and 46 listed above, the ILTD server 12 includes the following modules:

PSTN Network Interface (PNI) module: The PNI module operates the PSTN network interface cards 40 and enables the termination telephone calls offered by the serving switch 35 of the PSTN 34. The PNI module is responsible for capturing the Dns, Dnc and name_c that are delivered to the ILTD server 12 over a PRI 16 or equivalent trunk. Alternatively, the PSTN Network Interface module functions can be implemented using an SS7 interface.

Voice Processing (VP) module: The VP module operates the voicing processing board 42 and the vocoder 44 to perform all voice processing related functions such as the playback of audio prompts and the like.

State Management (SM) module: The SM module is responsible for tracking the presence of subscribers. When a subscriber's computer 24 is active and connected to the Internet 18, the ILTD client software 26 will notify the ILTD server 12 by sending a login request to the ILTD server 12. The login request contains the subscriber's IP address along with their DN, password and other service related parameters (such as version of the service to which they subscribe). When the SM module receives the login request it validates or denies the request.

If the request is validated the subscriber is considered and able to receive or make telephone calls over the Internet 18. The SM module continues to monitor the presence of the subscriber throughout the life of their connection. The ILTD client software 26 will periodically send a confirmation message to the ILTD server 12 notifying it that it is still connected. If the SM module does not receive a confirmation message from the ILTD client software 26 within a predetermined time, such as every 3 minutes, it will attempt to communicate with the subscriber, at the previously recorded IP address, to determine if they are still connected.

The ILTD client software 26 is a compiled software application residing on the subscriber's computer 24. The ILTD software 26 acts as the 'soft telephone' for the subscriber. Its function is to monitor for the presence of an Internet connection on the subscriber's computer 24 and once found, attempt to authenticate itself with the appropriate ILTD server 12. The authentication process involves the transmission of the subscriber's telephone number (Dns), a password, an IP (Internet Protocol) address and other subscriber profile data.

The ILTD client software 26 also has the responsibility of communicating with multimedia hardware/software (sound card 24a, microphone 24b) and operating systems on the computer 24. This enables the subscriber to communicate via voice through the computer 24 back to the ILTD server 12 and ultimately back to the calling party (Dnc and name_c).

IP Based Telephone Line Call Processing Method—Receiving Calls

Figure 2A:
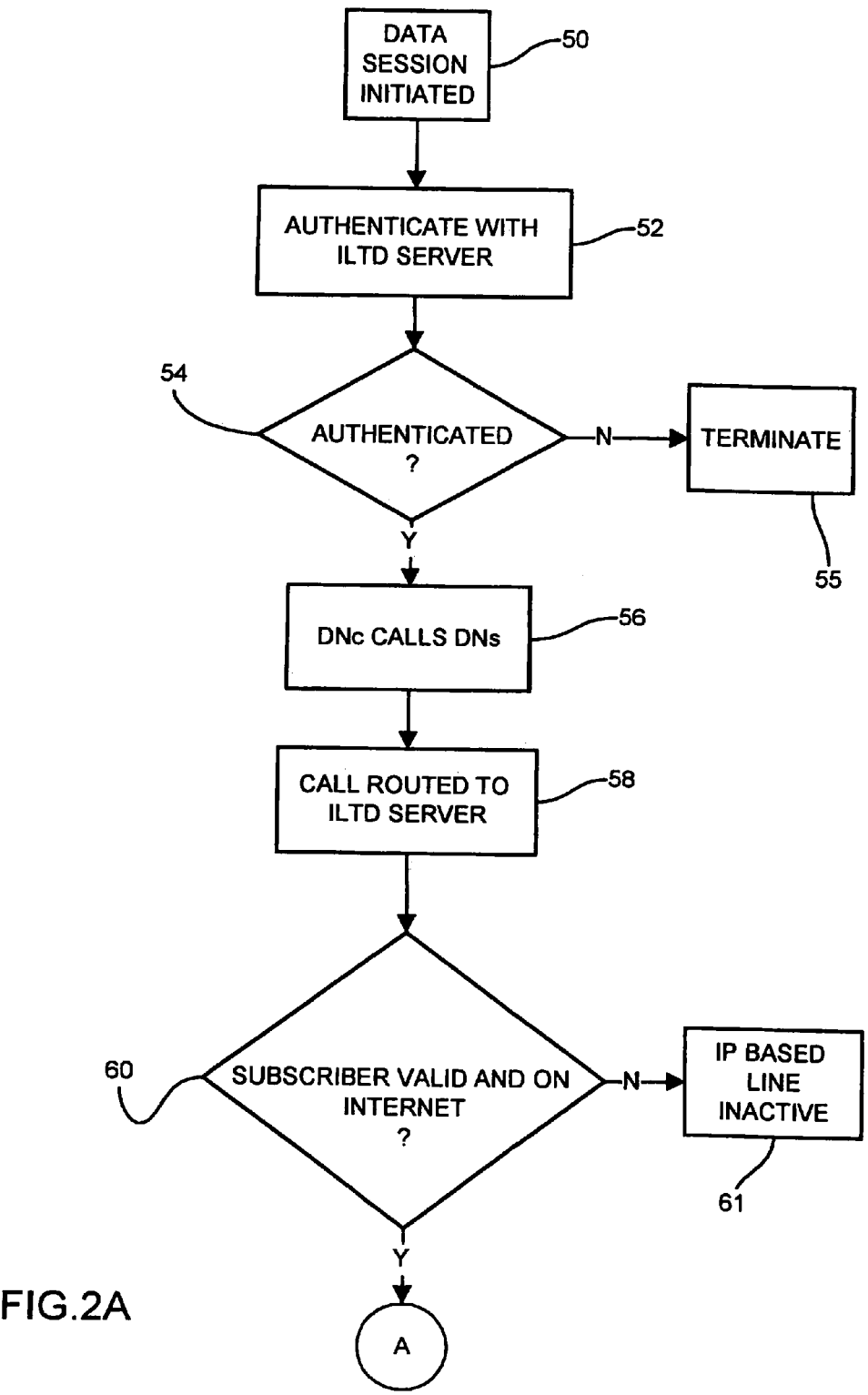
FIGS. 2A and 2B represent a flow chart illustrating the steps of the Internet based telephone line functionality according to an embodiment of the present invention.
Figure 2B:
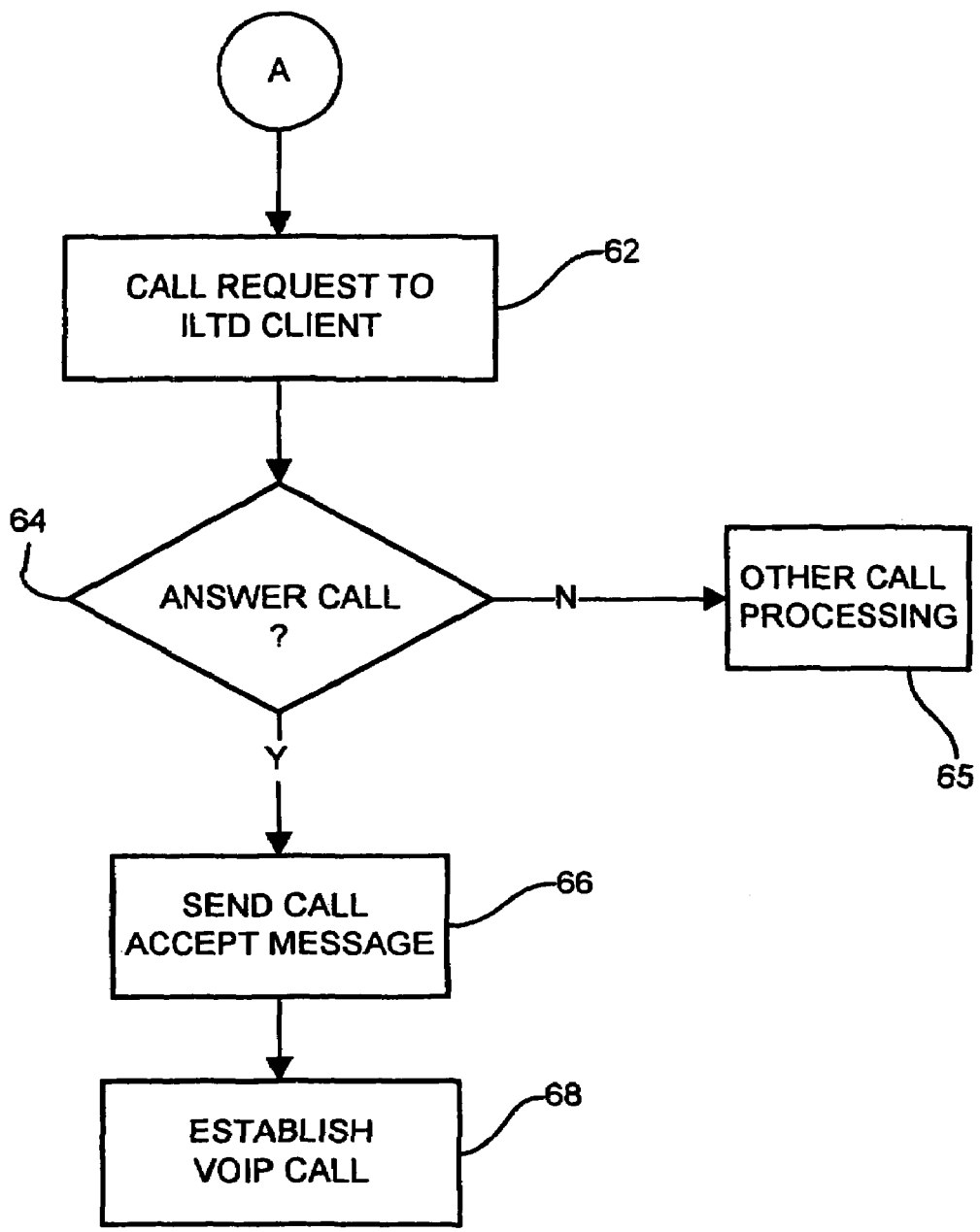

A call processing method according to an embodiment of the present invention is illustrated in the flow chart of FIGS. 2A and 2B.

Step 50: The subscriber's computer 24 is activated and connected to the Internet 18 using any one of many well known methods, including dialup over a standard POTS line, ISDN, cable modem, ADSL or "1 Meg" modem type service.

Step 52: The ILTD client software 26 sends an authentication request message to the ILTD server 12 via the Internet 18.

Steps 54 and 55: The ILTD server 12 either authenticates or denies the request (proceed to step 56 if authenticates, terminated at step 55 if ILTD server 12 denies the request).

Step 56 Call is made to the subscriber's telephone number (Dns).

Step 58: Call is routed via the PSTN 34 and offered to the ILTD server 12. Call setup message containing the subscriber number (Dns), calling party number (Dnc), calling party name (name_c) is delivered to the ILTD server 12.

Steps 60 and 61: The ILTD server 12 verifies that the subscriber is a valid subscriber and whether or not they are authenticated, meaning they are connected to the Internet 18 (proceed to step 62 if yes, Internet based telephone line is inactive at stage 61).

Step 62: ILTD server 12 sends the call request/notification via the Internet 18 to the ILTD client software 26. This notification contains the calling party number (Dnc) and name (name_c).

Step 64 and 65: ILTD client software 26 initiates a 'popup' window on the computer screen indicating that someone is calling. The subscriber can select to answer (proceed to step 66) or perform other call processing functions at step 65 (such as transfer call, ignore call, acknowledge call by playing a prescribed message, or send the call to voice mail).

Step 66: The ILTD client software 26 sends a Call Accept message back to the ILTD server 12.

Step 68: The ILTD server 12 negotiates with the ILTD client software 26 or appropriate voice software communications packages (via standard H.323 protocol) to establish a voice telephone call using Internet Protocol (i.e. voice-over-Internet-Protocol: VOIP) between the ILTD server 12 and the subscriber's computer 24.

The subscriber 22 can also use telephone 30 to make outgoing calls using VOIP when an Internet session is activated on the computer 24 following the basic principles outlined in FIGS. 2A and 2B. In particular, when the subscriber 22 has an active Internet connection the computer 24 is used to establish a VOIP call through the Internet 18 using the ILTD server 12.

In summary, the IP based telephone line service of the present invention does not merely redirect a call from the subscriber's POTS line. The DID number is actually hosted on the ILTD server 12 and when it is dialed the call is connected to the ILTD server 12 then converted to VOIP to get to the subscriber 22.

The invention claimed is:

1. A method for processing a call using call direction services that selectively forward the call as Internet Protocol (IP) data to one of several registered clients, the method comprising:

registering one or more clients with a call direction server, wherein the call direction server includes:
    (1) a circuit-switched network interface card directly interfacing a circuit switched network and configured to receive one or more calls routed to the call direction server using registered call processing functions at a signaling system,
    (2) a data network interface card configured to communicate IP data with a data communications network,
    (3) a database of dialed number identifiers for valid subscribers, and
    (4) a controller configured to:
      (a) provide the call direction services,
      (b) receive client state and registration information from the data network interface card, and
      (c) update the database with the received client state and registration information,
  hosting the dialed number identifiers for valid subscribers on the call direction server;
  registering call processing functions with a signaling system to route calls from unique client numbers to the call direction server;
  receiving, from a client, a call routed to the call direction server using the registered call processing functions at the signaling system, the call received on the circuit-switched network interface card at the call direction server;
  obtaining dialed number information related to a unique client number registered at the signaling system;
  identifying a called party and corresponding computer address by comparing the dialed number information related to the unique client number registered at the signaling system to the dialed number identifiers in the database;
  determining, based on the registration information, whether the identified called party is a registered subscriber to the call direction services;
  determining, based on the state information, whether the identified called party is available to receive communications from the call direction services; and
  providing a message to the identified computer address corresponding to the dialed number identifier when the identified called party is determined to be a registered subscriber and available to receive communications.

2. The method of claim 1 wherein hosting the dialed number identifiers for valid subscribers on the call direction server includes using the circuit-switched network interface card to host the dialed number identifiers.

3. The method of claim 1 wherein hosting the dialed number identifiers for valid subscribers on the call direction server includes using the database to host the dialed number identifiers.

4. The method of claim 1 wherein hosting the dialed number identifiers for valid subscribers on the call direction server includes using the circuit-switched network interface card and the database that are each configured to host the dialed number identifiers.

5. The method of claim 1 wherein hosting the dialed number identifiers for valid subscribers on the call direction server includes interfacing with a telephone switch in a public switched telephone network configured to host the dialed number identifiers.

6. The method of claim 1 wherein hosting the dialed number identifiers for valid subscribers on the call direction server includes using a telephone switch to host the dialed number identifiers.

7. The method of claim 6 wherein using the telephone switch to host the dialed number identifiers includes using a registered subscriber's personal telephone number as the dialed number identifier.

8. The method of claim 1 wherein receiving the client state and registration information includes communicating with the clients using a Data-over-Cable (DOC) network.

9. The method of claim 1 wherein receiving the client state and registration information includes communicating with the clients using a Asynchronous Digital Subscriber Line (ADSL) network.

10. The method of claim 1 wherein receiving the client state and registration information includes communicating with the clients using a permanent data network.

11. The method of claim 1 wherein receiving the client state and registration information includes receiving a label for a name of the registered subscriber.

12. The method of claim 1 wherein receiving the client state and registration information includes receiving the dial number identifier of the registered subscriber.

13. The method of claim 1 wherein updating the database with the received client state and registration information includes continually monitoring a presence of the registered subscriber throughout a duration of a connection between a client and the call direction server.

14. The method of claim 1 further comprising engaging in negotiations with the client in order to identify which one of several voice software communication packages should be used when the call is forwarded using the call direction services.

15. The method of claim 1 further comprising receiving caller identification information from the circuit-switched network interface card and including the caller identification in the message to the identified computer address.

16. The method of claim 15 further comprising:
receiving an indication of a selected response action from the identified computer address; and
processing the call according to the selected response action.

17. The method of claim 16 further comprising:
prior to processing the call, validating that the received indication of the selected response action is a valid indicator for a valid response action.

18. The method of claim 16 wherein the selected response action was a call accept message and the method further includes connecting the call with the identified computer address to establish a voice communications over the data communications network.

19. A system configured to process a call using call direction services that selectively forward the call as Internet Protocol (IP) data to one of several registered clients, the system comprising:
  means for registering one or more clients with a call direction server, wherein the call direction server includes:
    (1) a circuit-switched network interface card directly interfacing a circuit switched network and configured to receive one or more calls routed to the call direction server using registered call processing functions at a signaling system,
    (2) a data network interface card configured to communicate IP data with a data communications network,
    (3) a database of dialed number identifiers for valid subscribers, and
    (4) a controller configured to:
      (a) provide the call direction services,
      (b) receive client state and registration information from the data network interface card, and
      (c) update the database with the received client state and registration information,
  means for hosting the dialed number identifiers for valid subscribers on the call direction server;
  means for registering call processing functions with a signaling system to route calls from unique client numbers to the call direction server;
  means for receiving, from a client, a call routed to the call direction server using the registered call processing functions at the signaling system, the call received on the circuit-switched network interface card at the call direction server;
  means for obtaining dialed number information related to a unique client number registered at the signaling system;
  means for identifying a called party and corresponding computer address by comparing the dialed number information related to the unique client number registered at the signaling system to the dialed number identifiers in the database;
  means for determining, based on the registration information, whether the identified called party is a registered subscriber to the call direction services;
  means for determining, based on the state information, whether the identified called party is available to receive communications from the call direction services; and
  means for providing a message to the identified computer address corresponding to the dialed number identifier when the identified called party is determined to be a registered subscriber and available to receive communications.

20. The method of claim 1 wherein receiving a call routed to the call direction server includes receiving, on the public switched telephone network, a call routed to the call direction server.

21. The method of claim 1 wherein providing a message to the identified computer address includes providing a message to the identified computer addressed using the data network interface card configured to communicate IP data with the data communications network.

* * * * *

UNITED STATES PATENT AND TRADEMARK OFFICE
CERTIFICATE OF CORRECTION

PATENT NO. : 7,408,919 B1  
APPLICATION NO. : 09/567758  
DATED : August 5, 2008  
INVENTOR(S) : William P. McMullin Page 1 of 1

It is certified that error appears in the above-identified patent and that said Letters Patent is hereby corrected as shown below:

Column 5:
  Claim 1, line 61, delete the word "from" and insert the word --to--.

Claim 1, line 63, delete the word "from" and insert the word --at--.

Column 7:
  Claim 19, line 6, delete the word "from" and insert the word --to--.

Claim 19, line 8, delete the word "from" and insert the word --at--.

Signed and Sealed this

Twenty-third Day of December, 2008

JON W. DUDAS  
*Director of the United States Patent and Trademark Office*